(12) United States Patent
Arai

(10) Patent No.: US 7,146,259 B2
(45) Date of Patent: Dec. 5, 2006

(54) MOVABLE PERSONAL COMPUTER USING SYSTEM IN A MOTOR VEHICLE

(75) Inventor: Masatoshi Arai, Nakano-ku (JP)

(73) Assignee: Calsonic Kansei Corporation, Tokyo (JP)

( * ) Notice: Subject to any disclaimer, the term of this patent is extended or adjusted under 35 U.S.C. 154(b) by 175 days.

(21) Appl. No.: 10/801,553

(22) Filed: Mar. 17, 2004

(65) Prior Publication Data

US 2004/0186632 A1    Sep. 23, 2004

(30) Foreign Application Priority Data

Mar. 17, 2003    (JP)    ............................. 2003-072505

(51) Int. Cl.
*G06F 19/00*    (2006.01)
(52) U.S. Cl. .......................................................... 701/1
(58) Field of Classification Search .................... 701/1, 701/36, 93; 340/425.5; 345/1, 32; 361/681, 361/683; 359/837–844
See application file for complete search history.

(56) References Cited

U.S. PATENT DOCUMENTS 6,292,305 B1 *    9/2001    Sakuma et al. ............. 359/649
6,411,874 B1 *    6/2002    Morgan et al. ............... 701/36

* cited by examiner

*Primary Examiner*—Y. Beaulieu
(74) *Attorney, Agent, or Firm*—Wenderoth, Lind & Ponack, L.L.P.

(57) ABSTRACT

A movable personal computer using system is located inside an instrument panel of a motor vehicle, and has a PC holder on which a movable personal computer is set. The movable personal computer is connectable to a CAN of the motor vehicle, and has a screen showing different information on four partial areas of the screen at the same time. The screen is reflected by a mirror member toward a driver such that the driver sees a virtual image of the screen. The mirror member is moved to show a virtual image on a partial area of the screen, which displays information different from another partial area of the screen, and selectively shifts from the one partial area to the another partial area of the screen.

19 Claims, 6 Drawing Sheets

MOVABLE PERSONAL COMPUTER USING SYSTEM IN A MOTOR VEHICLE

BACKGROUND OF THE INVENTION

1. Field of the Invention

The present invention relates to a movable personal computer using system in a motor vehicle that is capable of using a movable personal computer in the motor vehicle to show a virtual image of a screen on a display of the movable personal computer to a passenger.

2. Description of the Related Art

A mobile phone, a Personal Digital Assistance (PDA), a movable personal computer such as a notebook sized personal computer, and the like are usually used indoors and outside. Some of these items are brought into motor vehicles and attached to an instrument panel for their usage.

A conventional mobile phone using system in a motor vehicle of this kind is disclosed in, for example, Japanese patent laying-open publication NO. Tokkai 2002-127834. This system has a cradle that holds and supplies electric power to a hand-held sized communication terminal including a cellular phone, and a stay which is attached to an instrument panel to support the cradle. This enables hand-free use of the hand-held sized communication terminal in a motor vehicle to communicate with an exterior of the vehicle.

Another mobile phone using system in a motor vehicle of this kind is disclosed in, for example, Japanese patent laying-open publication NO. Tokkai 2002-236632. This system has a mobile phone that is supplied with electric power from the motor vehicle and communicates with an exterior of the vehicle, an on-board wireless communication terminal to communicate with outside servers, and an on-board navigation system that receives necessary information selectively from the mobile phone and the wireless communication terminal.

The above known conventional mobile phone using systems in motor vehicles, however, encounter such a problem in that functions available in the systems are specialized to be within narrow limits and their displays are too small to show various information during vehicle running.

Compared with the hand-held sized communication terminal such as a mobile phone and a PDA, a movable personal computer, such as a notebook sized personal computer, has various functions including, for example, electronic mail, voice recognition, advanced graphics, and the like, and a wide screen display to display many characters and graphical contents in an easily viewable way.

If the movable personal computer is held on an instrument panel and used in such a conventional manner as described above, the computer needs a large space outside of the instrument panel. This results in that a field of view from a driver's seat is narrowed and/or the computer interferes with driving operation, such as a steering wheel operation. Moreover, when its display is in sunlight, it exhibits poor visibility of a screen on the display.

It is, therefore, an object of the present invention to provide a movable personal computer using system in a motor vehicle which overcomes the foregoing drawbacks and can use a movable personal computer with good visibility of its screen and without narrowing a field of driver's view or interfering with a driving operation.

SUMMARY OF THE INVENTION

According to the present invention, there is provided a movable personal computer using system in a motor vehicle comprising: a PC holder which is arranged inside an instrument panel of the motor vehicle to hold a movable personal computer in the instrument panel in a manner that the movable personal computer is attachable to and detachable from the PC holder; and a virtual image displaying device that shows a virtual image of a screen on a display of the movable personal computer attached to the PC holder so that the virtual image can be seen from a passenger compartment of the motor vehicle. The virtual image displaying device shows a virtual image reflecting a partial area of the screen that appears with information different from another partial area of the screen appearing at the same time, and is capable of moving to selectively shift the virtual image of the screen from the one partial area to the another partial area of the screen.

Therefore, in this movable personal computer using system, a driver can use the movable personal computer with good visibility of its screen and without narrowing the field of driver's view or interfering with a driving operation.

Moreover, the movable personal computer can execute various tasks quickly and show its executed results, including different information, on the screen at the same time. These executed results can be selectively shown as a reflected virtual image by the virtual image displaying device. At this time, the virtual image displaying device shows only a partial area of the screen, which reduces a size of the virtual image displaying device. Nevertheless, the virtual image displaying device can show many virtual images of various information by moving over the screen.

Preferably, the virtual image displaying device has a mirror moving mechanism to move the virtual image displaying device over the screen of the display and shift virtual images according to a shift demand signal.

Therefore, the virtual image displaying device can be made smaller and move to a partial area of the screen showing information that a driver needs, and display this information to the driver. Moreover, the screen and processing ability of the movable personal computer can be used at a high performance level.

Preferably, the movable personal computer receives vehicle state information from the motor vehicle to output alert information to a driver of the motor vehicle.

Therefore, the movable personal computer can obtain information on a vehicle state and decide whether or not alert information is to be shown by the virtual image displaying device. This alert information brings safe driving to the driver.

Preferably, the movable personal computer is prevented from use in a normal personal computer mode when a vehicle speed exceeds substantially zero Km/h, and is allowed to be used in the normal personal computer mode when the vehicle speed becomes substantially zero Km/h.

Therefore, use in the personal computer mode is prevented during vehicle running, which brings safe driving to the driver, not distracting his or her attention from a driving operation.

Preferably, the movable personal computer using system in a motor vehicle further comprises: a wireless communication facility to communicate between the movable personal computer and outside of the motor vehicle, and wherein the movable personal computer shows an incoming result received by the wireless communication facility when a vehicle speed becomes substantially zero Km/h.

Therefore, the movable personal computer can receive the incoming result, such as an E-mail, but not show it on the virtual image displaying device while the motor vehicle is running to assure safe driving. This results in that a user can see the incoming result immediately when the motor vehicle stops.

Preferably, a data connector of the PC holder is connectable to a data input/output connector of a movable personal computer so that a Controller Area Network of the motor vehicle and the movable personal computer are linked to each other.

Therefore, the movable personal computer and the Controller Area Network of the motor vehicle can be linked to each other to exchange data of information between them and use the data.

Preferably, the PC holder has a height adjuster that adjusts a holding position of the movable personal computer in a vertical direction when the movable personal computer is held by the PC holder.

Therefore, the movable personal computer can be easily adjusted to an appropriate height so that a driver can see a virtual image through the virtual image displaying device in a natural attitude.

Preferably, the virtual image displaying device is arranged inside the instrument panel, and the instrument panel has an opening through which the virtual image of the screen on the display of the movable personal computer can be seen from a passenger compartment of the motor vehicle.

Therefore, a driver can see the virtual image through the opening of the instrument panel.

Preferably, the movable personal computer has a body and a display that is connected to and rotatable with respect with the body so that the display and the body can be rotated relative to each other and form a figure such as one of V-letter shaped, L-letter shaped, and U-letter shaped figures to face a screen on the display to the virtual image displaying device when the movable personal computer is held on a PC holder.

Therefore, it becomes easier to take the movable personal computer into and out of the PC holder.

Preferably, the movable personal computer is a notebook sized personal computer.

As a notebook sized personal computer has a high leveled processing ability and a wide screen that can show various information, the movable personal computer using system can utilize its high leveled ability.

Preferably, the movable personal computer is connectable to a Controller Area Network of the motor vehicle to communicate with an on-board device.

Therefore, the movable personal computer and the on-board device can exchange information so that the movable personal computer can use this information. This results in that the movable personal computer can show information concerning a vehicle state, such as a vehicle speed, an engine rotational speed, navigation information, and the like.

Preferably, the PC holder has a lift mechanism that adjusts a holding position of the movable personal computer in a vertical direction when the movable personal computer is held on the PC holder.

Therefore, the lift mechanism can locate the movable personal computer so that the driver, in a normal driving attitude, can see a reflected image of the screen on the display via the virtual image displaying device.

BRIEF DESCRIPTION OF THE DRAWINGS

The objects, features and advantages of the present invention will become apparent as the description proceeds when taken in conjunction with the accompanying drawings, in which.

DESCRIPTION OF THE PREFERRED EMBODIMENTS

Figure 1:
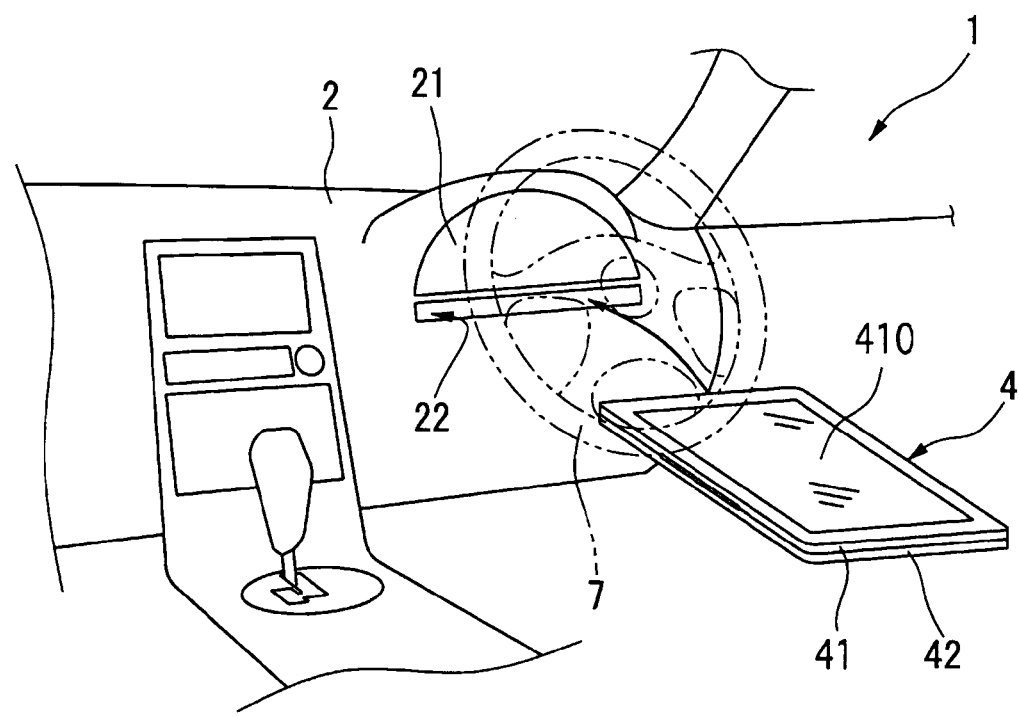
FIG. 1 is a perspective view showing a movable personal computer using system, with a movable personal computer just before being held in a PC holder, of a first embodiment according to the present invention.

Throughout the following detailed description, similar reference characters and numbers refer to similar elements in all figures of the drawings.

First, a movable personal computer using system in a motor vehicle of a first embodiment according to the present invention will be described with reference to accompanied drawings.

Figure 2:
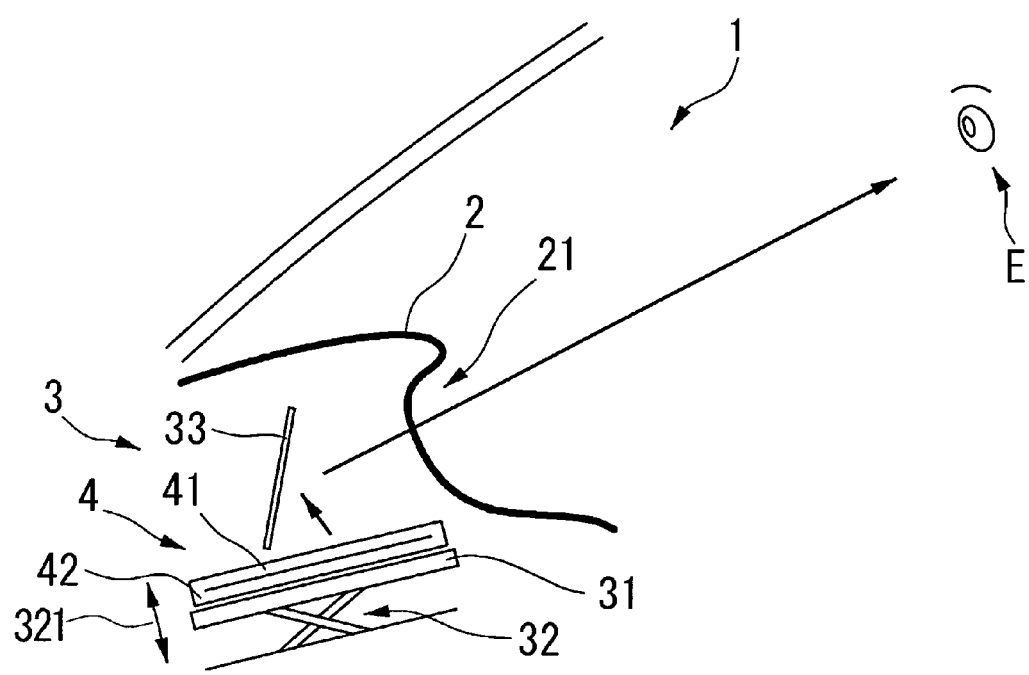
FIG. 2 is a schematic side view showing an inside of the movable personal computer using system where the movable personal computer is held on the PC holder, and also illustrating a physical relationship between a mirror member of the movable personal computer using system and driver's eyes.

Referring to FIGS. 1 and 2 of drawings, movable personal computer using system 3 is provided inside an instrument panel 2, also called a dashboard, so that a driver, as a user of the movable personal computer using system 3, can use it at a driver's seat position in a passenger compartment 1.

The instrument panel 2 is formed with an opening 22 under a visual display 21 so that a movable personal computer 4 can be inserted through the opening 22 and set to the movable personal computer using system 3 when a steering wheel 7 is tilted upward beyond the opening 22.

In this first embodiment, the movable personal computer 4 is a notebook sized personal computer. The personal computer 4 has a body 42 containing a central processing unit (CPU) and memory, and provided with a keyboard on its screen 410 side surface and a display 41, such as a Liquid Crystal Display, with the screen 410 showing processed results of the CPU.

The display 41 and the body 42 are connected rotatably to each other in a manner that they can be moved with respect to each other. When the personal computer 4 is used, the display 41 and the body 42 are moved to form a figure such as one of V-letter shaped, L-letter shaped, and U-letter shaped figures.

In this embodiment, the display 41 and the body 42 are moved to form a V-letter shaped figure when it is used in the movable personal using computer system 3. Namely, the screen 410 side of the display 41 and a keyboard side on the body 42 of the personal computer 4 are rotated with respect to each other by approximately 360 degrees from a closed position to a fully opened position so that their sides are located at each outer side with their back sides, top outer side of the display 41 and bottom side of the body, facing each other. When not used, the screen 410 and the keyboard are located in a closed position such that they face and contact each other.

Figure 3:
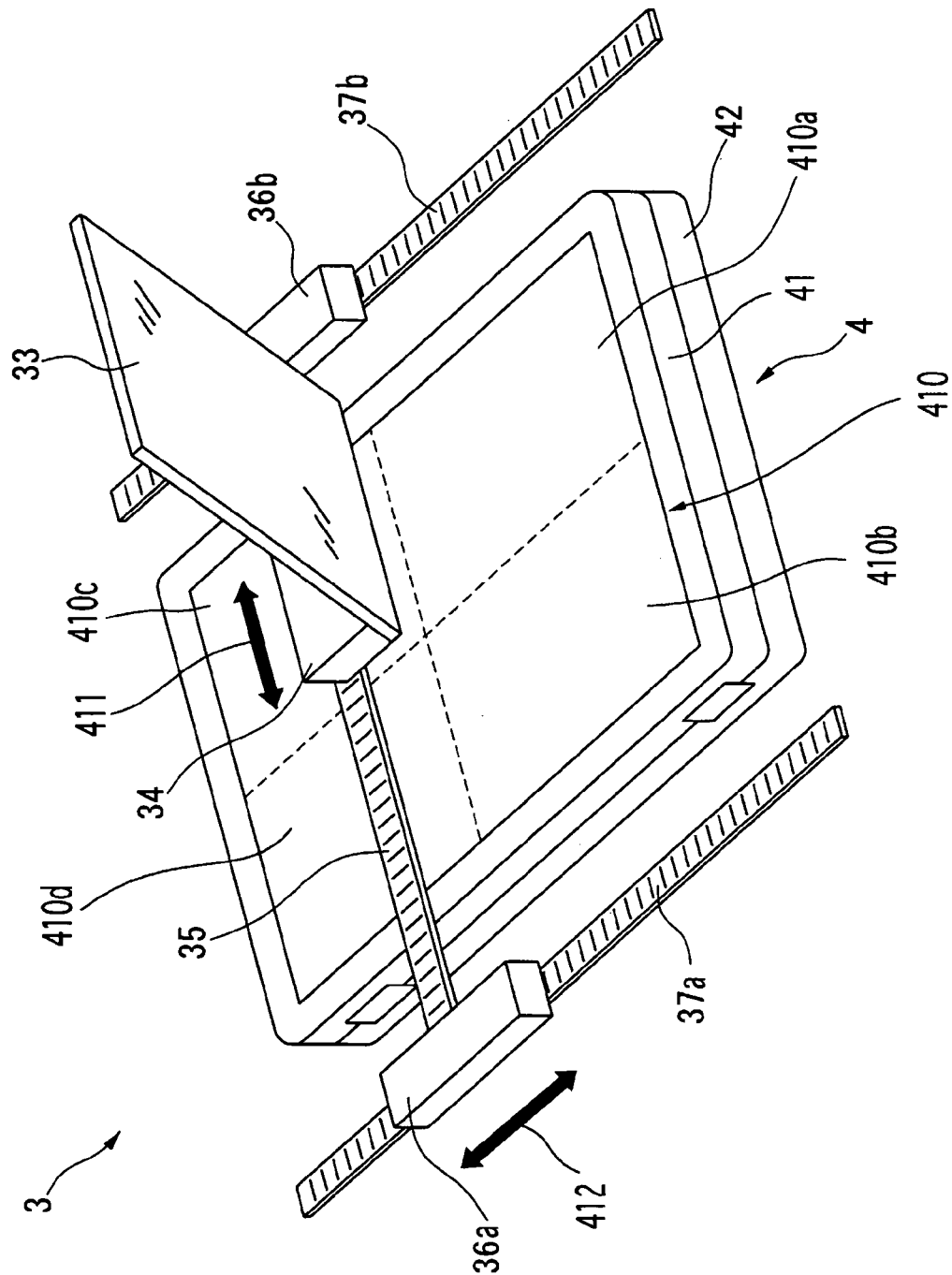
FIG. 3 is a perspective view showing the movable personal computer and a mirror member moving mechanism of the movable personal computer using system in FIGS. 1 and 2.

Referring to FIGS. 2 and 3, the movable personal computer using system 3 has a PC holder 31 to hold the movable personal computer 4, a lift mechanism 32 that moves the PC holder 31 in an upward and downward direction, a movable mirror member 33 to show a reflected image of the screen 410 on the display 41 of the personal computer 4, and a mirror moving mechanism 38 to move the movable mirror member 33 in longitudinal and lateral directions over the screen 410 on the display 41. The movable mirror member functions as a virtual image displaying device of the present invention.

The PC holder 31 has a not-shown restrainer to restrain the personal computer 4 on a flat upper surface of the PC holder 31. The PC holder 31 is provided with the lift mechanism 32 having two links joined rotatably to each other at their middle portions to form an X-letter shape. The two links are connected at their one ends with the PC holder 31 and at their other ends with a support member of the instrument panel 2. The links are driven by an electric motor, not shown, to move toward and away from each other, resulting in the PC holder 31 moving upward and downward as indicated by an arrow 321 in FIG. 2. When the personal computer 4 is set to or removed from the PC holder 31, the lift mechanism 32 sets up the PC holder 31 at a predetermined height so that the personal computer 4 can be passed through the opening 22 of the instrument panel 2.

Note that the opening 22 is designed to have a width wider than the personal computer 4, so that a user can put his fingers into empty spaces of opening 22 formed at both sides of the personal computer 4 and catch hold of the both sides of it when it is inserted into or removed from the opening 22.

Over the PC holder 31, there is provided the movable mirror member 33 having a mirror that reflects images of characters, text, graphics, and the like on the screen 410 of the display 41 so that driver's eyes E can see them. This mirror is designed to have a size so as to reflect only a partial area of the screen 410, for example, one-quarter of the screen 410 of the display 41 as shown in FIG. 3.

The screen 410 on the display 41 shows information different from each other in four partial areas, a first to fourth partial area 410 a, 410b, 410c, and 410d of the screen 410 at the same time in this embodiment. For example, one of these partial areas shows vehicle state information which is needed for normal driving of a motor vehicle, such as a vehicle speed and an engine speed, another partial area shows alert information, which is not necessary in normal driving but needed in special cases, such as alerts concerning a fuel remaining amount and an engine temperature, and the other partial areas show different information such as navigation information and the like.

The movable mirror member 33 is adjusted to have an inclination with respect to the screen 410 so that its screen image are seen as images on a plane perpendicular to a direction of driver's gaze, which results in that a driver can easily see a reflected virtual image of the screen 410 on the display 41.

The mirror moving mechanism 38, as shown in FIG. 3, includes a first driving part 34 attached to a bottom portion of the movable mirror member 33, a first rail 35 extending in a longitudinal direction of the motor vehicle, two second driving parts 36a and 36b connected to end portions of the first rail 35, respectively, and two second rails 37a and 37b extending along a latitudinal direction of the motor vehicle.

The first and second driving parts 34, 36a, and 36b contain respectively a pinion driven by a electric motor, while the first and second rails 35, 37a, and 37b have respectively a rack on an upper side thereof to respectively mate the pinion of the first and second driving parts 34, 36a, and 36b. By the racks and the pinions driven by the electric motors, the first driving part 34 can move side to side on the first rail 35 as indicated by an arrow 411, and the second driving parts 36a and 36b can move, with the first rail 35 and the first driving part 34, back and forth on the second rails 37a and 37b as indicated by an arrow 412.

Therefore, the movable mirror member 33 is capable of moving in the longitudinal and latitudinal directions over the screen 410 for covering each partial area 410a to 410d of the screen 410 so as to shift their reflected images such that a driver can see and be given different information according to his or her requirements.

Figure 4:
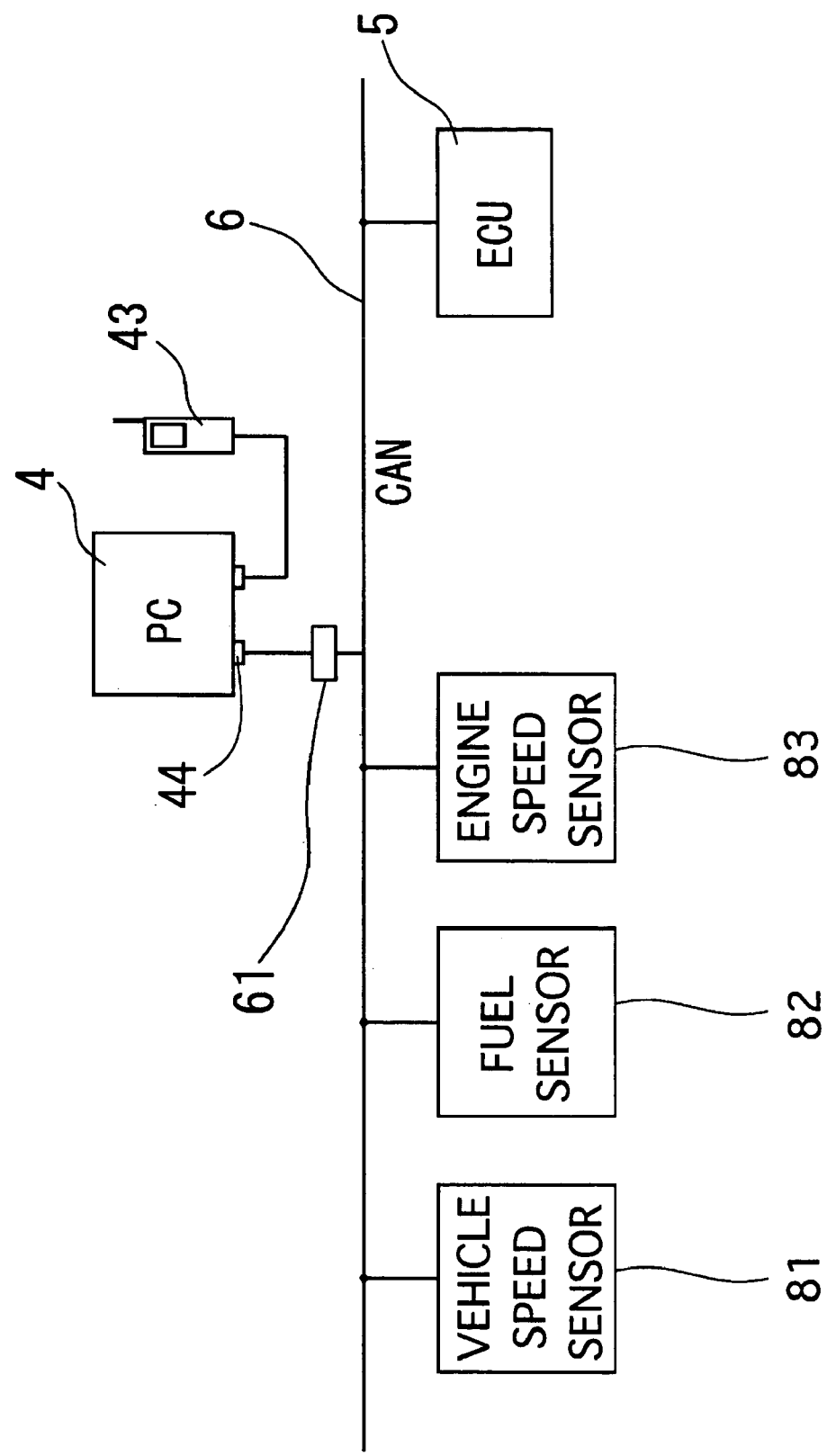
FIG. 4 is a schematic diagram showing a connection relationship of the movable personal computer and a CAN of a motor vehicle through a USB connecting port.

Referring to FIG. 4, the personal computer 4 is connectable to a cellular phone 43 to send and receive information between the personal computer 4 and an exterior of the motor vehicle, such as the Internet Network. The cellular phone 43 functions as a wireless communication facility of the present invention.

The personal computer 4 has a USB connecting port 44 to connect to a Controller Area Network (CAN) BUS line 6 in the motor vehicle through USB—CAN interface 61 for exchanging information between the CAN and the personal computer 4 when they are linked. The CAN BUS line 6 is linked with a vehicle speed sensor 81 outputting a vehicle speed signal, a fuel sensor 82 outputting a fuel remaining amount signal, an engine speed sensor 83 outputting an engine speed signal, an engine control unit (ECU) 5 outputting information on an engine state, a navigation system, not shown, and the like. The vehicle speed sensor 81, the fuel sensor 82, the engine speed sensor 83, the ECU 5, and the navigation system function as on-board devices of the present invention.

Next, an operation of the movable personal computer using system 3 will be described with reference to the drawings.

In order to use the movable personal computer using system 3, the personal computer 4 is set to the PC holder 31 of the movable personal computer using system 3.

Namely, the personal computer 4 is brought into a passenger compartment 1 of the motor vehicle. Then, the screen 410 on the display 41 and the keyboard on the body 42 are moved to be in a position opposite to each other.

Then, the steering wheel 7 is tilted upward, resulting in exposure of the opening 22 of the instrument panel 2. Through the opening 22, the personal computer 4 is inserted and set to the PC holder 31 of the movable personal computer system 3 in such a state that the keyboard on the body 42 contacts the PC holder 31, and the screen 410 on the display 41 turns upward to face the mirror of the movable mirror member 33.

At this setting step, the personal computer 4 and the CAN are connected by the USB port 44 of the personal computer 4 and the USB—CAN interface 61, which allows exchange of information therebetween.

After these settings, a height position of the personal computer 4 is adjusted by the lift mechanism 32 so that the driver, in a normal driving attitude, can see a reflected image of the screen 410 on the display 41 through the movable mirror member 33.

Figure 5:
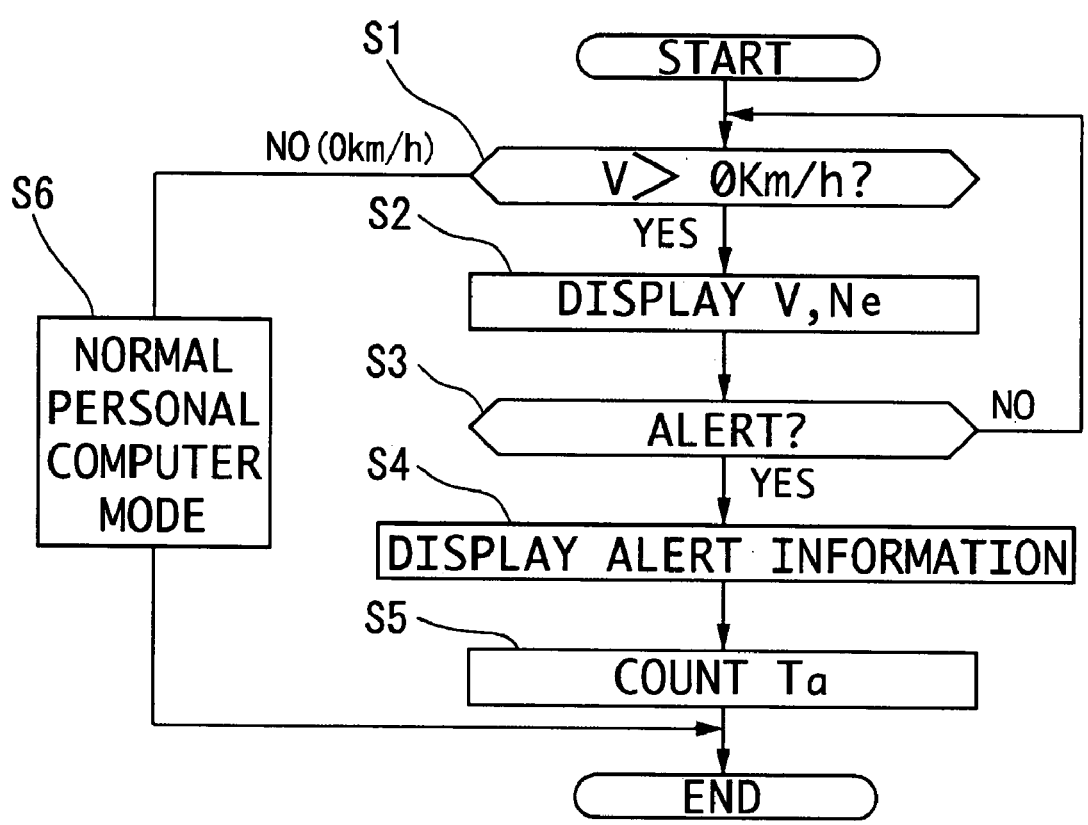
FIG. 5 is a flowchart executed by the movable personal computer when it is held in the PC holder of the movable personal computer using system.

The CPU of the personal computer 4 executes a flowchart shown in FIG. 5 as follows.

The personal computer 4 receives a vehicle speed signal from the vehicle speed sensor 81, a fuel remaining amount signal from the fuel sensor 82, an engine speed signal from the engine speed sensor 83, and information on an engine state from the ECU 5. Additionally, the personal computer 4 sends and receives information to and from the exterior of the motor vehicle through the cellular phone 43.

At step S1, the CPU of the personal computer 4 determines whether or not a vehicle speed V exceeds substantially zero Km/h. If YES, flow goes to a step S2, while, if NO, it goes to a step S6.

If YES, the CPU judges that the motor vehicle is running, which prevents the personal computer 4 from working in a normal personal computer mode so as to acquire safe driving. Herein, a normal personal computer mode denotes a mode that personal computers normally have processing functions, which are not necessary for driving of a motor vehicle, including word processing, electronic mailing, and the like for example.

To the contrary, while the motor vehicle is running, the personal computer 4 executes tasks for acquiring information necessary for driving of the motor vehicle, based on information obtained from the ECU 5, the vehicle speed sensor 81, and the other sensors.

At the step S2, the personal computer 4 causes the display 41 to show vehicle speed V and the engine speed Ne to the driver on one of the partial areas 410a to 410d of the screen 410, for example, the first partial area 410a. The movable mirror member 33 is moved by the driving parts 34, 36a, and 36b to be positioned over the one of the partial areas 410a to 410d, in this embodiment, the first partial area 410a as shown in FIG. 3, and show a reflected image of information on the vehicle speed V and the engine speed Ne to the driver to assist normal driving of the motor vehicle.

Then, the flow goes from the step S2 to a step S3. At the step S3, the personal computer 4 receives engine state information from the ECU 5, a fuel remaining amount signal from the fuel sensor 82, and an engine temperature signal from an engine temperature sensor through the CAN BUS line 6, and determines based on the above information whether or not alert information, concerning a fuel remaining amount and an engine temperature for example, is necessary to be conveyed to the driver. This judgment is based on whether or not a fuel remaining amount becomes below a predetermined amount, and whether or not an engine temperature becomes beyond a predetermined temperature. If one of these judgment is YES, the CPU of the personal computer 4 judges alert information to be displayed to the driver.

If judgment at the step S3 is YES, the flow goes to a step S4, while, if NO, it returns to the step S1. Note that the alert information appears on another partial area of the partial areas 410a to 410d, for example, the second partial area 410b on the screen 410 of the display 41, whether or not the alert information is necessary for the driver.

At the step S4, the movable mirror member 33 is moved by the driving parts 34, 36a, and 36b, based on a shift demand signal to be positioned over the another partial area of the screen 410, the second partial area 410b displaying the alert information and show a reflected image of this information to the driver.

The flow goes from the step S4 to a step S5. At the step S5, the CPU counts time elapsing from a starting time of showing the alert information to the driver by the movable mirror member 33. Then, after a counted time becomes a predetermined elapsed time, the movable mirror member 33 is moved from a position over the second partial area 410b showing the alert information to a position over the first partial area 410a showing information for normal driving, such as the vehicle speed and the engine speed. Therefore, continuously displaying the alert information is avoided and vehicle state information is shown to the driver, which brings to the driver information pertaining to safe driving.

The third partial area 410c displays, for example, navigation information based on a GPS antenna, not shown. The movable mirror member 33 is moved to a position over the third partial area 410c to reflect its virtual image according to a user's demand. When the driver wants to use navigation information, the driver can obtain it, for example, by pressing a shift button, not shown, to output a shift demand signal to the CPU.

On the other hand, when the motor vehicle comes to a halt, the flow goes to the step S6. At this step, the personal computer 4 is allowed to shift to the normal personal computer mode.

Moreover, the personal computer 4 receives E-mails from the exterior of the motor vehicle through the cellular phone 43 even while it is running, which enables the personal computer 4 to show received E-mails and their contents, as incoming results of the present invention, when the motor vehicle stops. These received E-mails are shown on the fourth partial area 410d whether the motor vehicle is running or not. Nevertheless, an operation of E-mail to send and/or receive is prohibited while the vehicle speed exceeds substantially zero Km/h. When the vehicle speed becomes substantially zero Km/m, the user can see the E-mails immediately.

After utilization of the movable personal computer using system 3, in order to stop it, the personal computer 4 is powered off.

When the driver wants to use the personal computer 4 outside, the driver can insert his or her fingers into the opening 22 and pull it out through the opening. At this time, the USB connecting port 44 of the personal computer 4 is disconnected from the USB—CAN interface 61.

As described above, utilization of the movable personal computer 4 with the movable personal computer using system 3 in the motor vehicle has the following advantages.

Information stored in the movable personal computer 4 can be transferred without a movable storage medium such as a CD-ROM, a Floppy Disk, and the like, and used in the movable personal computer using system 3. This function reduces duplication of communication such that each device communicates with the same server to obtain the same information therefrom, which can provide seamless communication between the motor vehicle and the exterior thereof, for example, home, office, and the like.

In addition, this movable personal computer using system 3 has thief protection, in that the movable personal computer 4 is hard to see from outside of the motor vehicle regardless of whether it is set on the PC holder 31. This reason comes from the personal computer 4 being set inside the instrument panel 2 and obscured thereby, and the display 41, whose screen 410 is reflected as a screen image by the movable mirror member 33, of the personal computer 4 being located backward and inside of the instrument panel 2.

When the movable personal computer 4 is set to the movable personal computer using system 3, held on the PC holder 31, and the USB connecting port 44 and USB—CAN interface 61 are connected to each other, the personal computer 4 and the CAN line 6 of the motor vehicle are linked to each other as shown in FIG. 4, which enables exchange of data therebetween. For example, in this embodiment, the personal computer 4 receives data from the vehicle speed sensor 81, and other sensors 82 and 83.

The display 41 can shown different information on its screen 410 at the same time, for example, not only the above described instrument information such as a vehicle speed, an engine speed and the like, but also information inputted from other on-board devices such as the ECU 5, the navigation system and the like. Additionally, the personal computer 4 has an ability to display in various manners. The movable mirror member 33 can move to a position of one of the partial areas 410a to 410d of the screen 410 and show its reflected image to a driver. Additionally, the movable mirror member 33 enables the driver to see images in the same color as the screen on the display 41 of the personal computer 4, so that the driver can easily realize what is displayed.

The personal computer 4 and the motor vehicle are associated with each other so that the personal computer 4 is capable of displaying on the instrument screen information about the motor vehicle, obtained from the vehicle speed sensor 81 and the like, while its use as a personal computer is restricted during vehicle running. This brings safe driving to the driver, for not distracting his or her attention from a driving operation.

A screen image, which the driver sees, can be easily changed into a various colored image, another desirable image selected by a driver, or the like by changing these on the screen 410 on the display 41. The screen image can show alert or important information about the motor vehicle obtained from CAN. These screen images can arrest the driver's attention more certainly.

Moreover, as the personal computer 4 has various functions much more than mobile phones and the like, the driver can use its functions in the motor vehicle.

As the personal computer 4 and the on-board devices are linked to each other through USB connecting port 44 and the CAN line, the on-board devices are capable of utilizing information stored in the personal computer 4 for their own uses.

As the display 41 is located inside of the instrument panel 2, it is not exposed to the sun directly. This results in that the display 41 is set under circumstances of adequate brightness for seeing a screen image, is eye-friendly, and is protected from malfunction caused by long exposure to sunlight.

Figure 6:
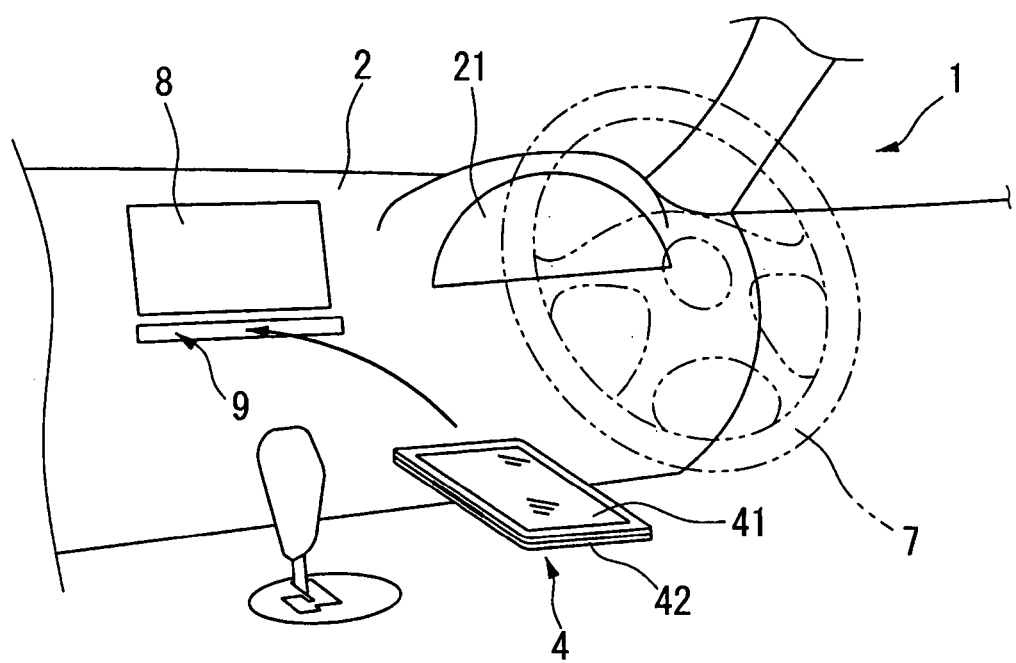
FIG. 6 is a perspective view showing a movable personal computer using system, with a movable personal computer just before being held in a PC holder, of a second embodiment according to the present invention.

Referring to FIG. 6 of the drawings, there is shown a movable personal computer using system in a motor vehicle of a second preferred embodiment according to the present invention.

In this second embodiment, a setting position of a movable personal computer using system is different from the first embodiment, but other parts are similar to the first embodiment.

The movable personal computer moving system of this embodiment is located inside and at a middle part of an instrument panel 2. Accordingly, an opening for inserting a personal computer 4 and display part 8 with a mirror member, not shown, are next to a steering wheel 7.

The personal computer 4 is linked to a navigation system and the like and displays different information, including navigation information, on a plurality of partial areas of a screen on a display. A mirror member can move to shift reflected virtual images of one of the partial areas of the screen according to a driver's need.

This movable personal computer system does not need to have a tilt mechanism for the steering wheel.

The embodiments of the present invention have been described above, but specific structure of the present invention is not limited to these embodiments. The present invention includes any change in design without departing from the gist of the invention.

A screen of the present invention may display different information on a plurality of partial areas, not only four as in the first embodiment, at the same time.

A virtual image displaying device may be composed of a plurality of movable mirror members. In this case, some or all of the movable mirror members are rotated between a not-seen position, in a horizontal state for example, and a reflecting position, in a tilted state as shown in FIGS. 2 and 3.

The movable personal computer 4 is not limited to a notebook sized personal computer, or data processing device, and a data processing device that has functions similar to those of a personal computer may be used in this movable personal computer using system.

The PC holder may have an additional function as a loader/ejector that brings a personal computer 4 in and out through the opening 22 or 9.

When the personal computer is used in a normal computer mode, it may be connected to an additional keyboard.

A movable personal computer using system in a motor vehicle may have an auxiliary display to display minimum information necessary for driving and of on-board devices when a display of the computer is failed or when the computer is not set to the using system.

A wireless communication facility of the present invention may be a wireless communication device other than a cellular phone.

The entire contents of Japanese Patent Application No. Tokugan 2003-072505 (filed Mar. 17, 2003) is incorporated herein by reference.

What is claimed is:

1. A movable personal computer using system for use in a motor vehicle, comprising:
   a PC holder, to be arranged inside an instrument panel of a motor vehicle, for holding a movable personal computer inside the instrument panel; and
   a virtual image displaying device including a mirror member for reflecting an image that is on a display screen of the movable personal computer, when the movable personal computer is held by said PC holder,
   wherein said PC holder is for holding a movable personal computer by detachably holding the movable personal computer,
   wherein said mirror member has a reflective surface that is smaller in area than a display area of the display screen such that said mirror member is for reflecting an image that is on the display screen of the movable personal computer by having said reflective surface reflect an image that is on one portion of the display screen of the movable personal computer, whereby this image can be seen by a passenger in the vehicle, and
   wherein said virtual image displaying device further includes a mirror member moving mechanism for moving said mirror member over the display screen of the movable personal computer such that, upon moving said mirror member by said mirror member moving mechanism, said reflective surface can reflect an image that is on another portion of the display screen of the movable personal computer, whereby this image can be seen by the passenger in the vehicle.

2. The movable personal computer using system according to claim 1, wherein
said mirror moving mechanism is for moving said mirror member over the display screen of the movable personal computer according to a shift demand signal inputted by the passenger.

3. The movable personal computer using system according to claim 2, wherein
said PC holder includes a lift mechanism for adjusting a position of the movable personal computer in vertical direction when the movable personal computer is held by said PC holder.

4. The movable personal computer using system according to claim 3, wherein
the movable personal computer has a body, and the display screen is connected to and rotatable with respect with the body so that the display screen and the body can be rotated relative to one another so as to form one of a V-letter shape, L-letter shape, and U-letter shape so as to allow the display screen to face said mirror member when the movable personal computer is held by said PC holder.

5. The movable personal computer using system according to claim 4, wherein
the movable personal computer is a notebook sized personal computer.

6. The movable personal computer using system according to claim 2, wherein
the movable personal computer has a body, and the display screen is connected to and rotatable with respect with the body so that the display screen and the body can be rotated relative to one another so as to form one of a V-letter shape, L-letter shape, and U-letter shape so as to allow the display screen to face said mirror member when the movable personal computer is held by said PC holder.

7. The movable personal computer using system according to claim 6, wherein
the movable personal computer is a notebook sized personal computer.

8. The movable personal computer using system according to claim 2, wherein
the movable personal computer is a notebook sized personal computer.

9. The movable personal computer using system according to claim 1, wherein
the movable personal computer is for receiving from the motor vehicle information pertaining to a state of the motor vehicle, and for outputting this information.

10. The movable personal computer using system according to claim 9, wherein
the movable personal computer is connectable to a Controller Area Network of the motor vehicle so as to communicate with an on-board device.

11. The movable personal computer using system according to claim 1, wherein
the movable personal computer is prevented from use in a normal personal computer mode, in which the movable personal computer can perform a function that is not necessary for driving of the motor vehicle, when a vehicle speed exceeds substantially zero Km/h, and can be used in the normal personal computer mode when the vehicle speed becomes substantially zero Km/h.

12. The movable personal computer using system according to claim 11, further comprising:
a wireless communication facility to allow for communication between the movable personal computer and outside of the motor vehicle,
wherein the movable personal computer is for showing an incoming result received by said wireless communication facility when the vehicle speed becomes substantially zero Km/h.

13. The movable personal computer using system according to claim 11, wherein
the movable personal computer is a notebook sized personal computer.

14. The movable personal computer using system according to claim 1, further comprising:
a wireless communication facility to allow for communication between the movable personal computer and outside of the motor vehicle,
wherein the movable personal computer is for showing an incoming result received by said wireless communication facility when the vehicle speed becomes substantially zero Km/h.

15. The movable personal computer using system according to claim 1, wherein
the movable personal computer has a body, and the display screen is connected to and rotatable with respect with the body so that the display screen and the body can be rotated relative to one another so as to form one of a V-letter shape, L-letter shape, and U-letter shape so as to allow the display screen to face said mirror member when the movable personal computer is held by said PC holder.

16. The movable personal computer using system according to claim 15, wherein
the movable personal computer is a notebook sized personal computer.

17. The movable personal computer using system according to claim 1, wherein
the movable personal computer is a notebook sized personal computer.

18. The movable personal computer using system according to claim 1, wherein
the movable personal computer is connectable to a Controller Area Network of the motor vehicle so as to communicate with an on-board device.

19. The movable personal computer using system according to claim 1, wherein
said PC holder includes a lift mechanism for adjusting a position of the movable personal computer in vertical direction when the movable personal computer is held by said PC holder.

* * * * *